United States Patent
Lee et al.

(10) Patent No.: US 10,167,757 B2
(45) Date of Patent: Jan. 1, 2019

(54) INSULATION STRUCTURE OF CATALYTIC CONVERTER OF VEHICLE

(71) Applicant: Hyundai Motor Company, Seoul (KR)

(72) Inventors: Jin Ha Lee, Seoul (KR); Jae Gi Sim, Seoul (KR); Jin Woo Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/377,812

(22) Filed: Dec. 13, 2016

(65) Prior Publication Data

US 2018/0100416 A1 Apr. 12, 2018

(30) Foreign Application Priority Data

Oct. 11, 2016 (KR) .......................... 10-2016-0131439

(51) Int. Cl.
*F01N 3/00* (2006.01)
*F01N 3/035* (2006.01)
(Continued)

(52) U.S. Cl.
CPC ........... *F01N 3/035* (2013.01); *F01N 3/0814* (2013.01); *F01N 3/0842* (2013.01);
(Continued)

(58) Field of Classification Search
CPC ........ F01N 3/2066; F01N 3/021; F01N 13/14; F01N 13/148
See application file for complete search history.

(56) References Cited

U.S. PATENT DOCUMENTS 6,444,287 B1 * 9/2002 Kalb .......................... B32B 5/02
428/100
7,152,633 B2 * 12/2006 White .................. F16L 59/021
138/149
(Continued)

FOREIGN PATENT DOCUMENTS

JP          2015102088 A    6/2015
KR    2020000018739 U    10/2000
(Continued)

OTHER PUBLICATIONS https://web.archive.org/web/20140901081932/http://www.kalbcorp.com/photo-gallery.html Dated Sep. 1, 2014 https://web.archive.org/web/20140902091848/http://www.kalbcorp.com:80/custom-heatblocker-ultra-performance-exhaust-insulation-services.html Sep. 2, 2014.*

*Primary Examiner* — Audrey K. Bradley
*Assistant Examiner* — Anthony Ayala Delgado
(74) *Attorney, Agent, or Firm* — Slater Matsil, LLP

(57) ABSTRACT

An insulation structure of catalytic converter of vehicle according to an exemplary embodiment of the present invention includes an LNT converter. A connecting housing is provided such that a urea reducing agent is injected to the exhaust gas when it is needed. An SDPF converter reduces nitrogen oxide contained in the exhaust gas using the injected reducing agent, and SCR catalyst is coated on a filter. An insulation cover including inner surface contacts the LNT converter, the connecting housing and the SDPF converter and also includes an outer surface which is opposing surface to the inner surface and surrounds the LNT converter, the connecting housing and the SDPF converter. The insulation cover insulates heat generated from the LNT converter, the connecting housing and the SDPF converter.

(Continued)

An insulation material is inserted and attached between the outer surface and the inner surface of the insulation cover.

20 Claims, 12 Drawing Sheets

(51) Int. Cl.
*F01N 3/20* (2006.01)
*F01N 3/08* (2006.01)
*F01N 13/14* (2010.01)

(52) U.S. Cl.
CPC .......... *F01N 3/2066* (2013.01); *F01N 13/14* (2013.01); *F01N 2250/02* (2013.01); *F01N 2510/02* (2013.01); *F01N 2570/10* (2013.01); *F01N 2570/12* (2013.01); *F01N 2570/14* (2013.01)

(56) References Cited

U.S. PATENT DOCUMENTS

| | | | |
|---|---|---|---|
| 7,886,529 B2* | 2/2011 | Gonze | F01N 3/027 60/274 |
| 8,561,396 B2* | 10/2013 | Nagaoka | F01N 3/02 422/170 |
| 9,464,546 B2* | 10/2016 | Perrot | F01N 13/02 |
| 2011/0072806 A1* | 3/2011 | Nagaoka | F01N 3/02 60/301 |
| 2014/0230418 A1* | 8/2014 | Perrot | F01N 13/02 60/324 |
| 2015/0143798 A1 | 5/2015 | Lee | |
| 2015/0184573 A1* | 7/2015 | Sim | B32B 15/01 428/593 |

FOREIGN PATENT DOCUMENTS

| | | |
|---|---|---|
| KR | 1020070067883 A | 6/2007 |
| KR | 101498182 B1 | 3/2015 |

\* cited by examiner

20

20

» Temperature reached after 90 seconds of SDPF entrance regeneration (℃)
» Average temperature from reaching 630 degrees of SDPF entrance regeneration (℃)

INSULATION STRUCTURE OF CATALYTIC CONVERTER OF VEHICLE

CROSS-REFERENCE TO RELATED APPLICATIONS

This application claims priority to and the benefit of Korean Patent Application No. 10-2016-0131439 filed in the Korean Intellectual Property Office on Oct. 11, 2016, the entire contents of which are incorporated herein by reference.

TECHNICAL FIELD

The present invention relates to an insulation structure of a catalytic converter of vehicle.

BACKGROUND

To regulate nitrogen oxide exhaust of a diesel car in a real road, real world driving emission (RDE) and world-harmonized light duty test procedure (WLTP) as reinforced exhaust regulations are in effect after July, 2017.

Particularly, to respond RDE reinforced exhaust regulation for nitrogen oxide exhaust suppress during driving of the diesel car in the real road, conventional LNT (Lean NOx Trap) and SCR (Selective Catalytic Reduction) which are post treatment devices of nitrogen desorption are difficult.

Nitrogen oxide purification efficiency of the LNT decreases abruptly in a high temperature and high load, and urea injection of the SCR is difficult in a low temperature and low load to decrease the nitrogen oxide purification efficiency abruptly.

Particularly, the SCR system may not inject urea in a low temperature (ammonia ($NH_3$) generation reaction by hydrolysis of urea solution in a below 170 degrees), and blocking phenomenon in an exhaust pipe occurs during injection in a low temperature condition by urea crystallization reaction to deteriorate nitrogen oxide purification efficiency in a low temperature.

To solve this problem, heat loss needs to be minimized in an exhaust system connected to SCR system.

To decrease heat loss of post treatment converter for purifying gas exhausted from an engine of a conventional technic, insulation material of silica non-woven or ceramic blanket type is attached to metal thin plate or cover having a certain shape and fixed to the converter by welding to prevent inside heat of the converter from emitting outside.

However, in the conventional converter structure, to prevent exhaust gas heat inside the converter transferred to the converter surface from emitting to atmosphere, the insulation material attached to the converter surface insulates the converter, and a metal insulation cover is welded on the insulation material to fix the insulation material to transfer heat through the welded portion to emit heat to insulation material cover around the insulation material. Also, the metal cover is made by molding metal plate. So, it is constrained to make the metal cover to insulate whole parts of the converter.

The above information disclosed in this Background section is only for enhancement of understanding of the background of the invention and therefore it may contain information that does not form the prior art that is already known in this country to a person of ordinary skill in the art.

SUMMARY

The present invention relates to an insulation structure of a catalytic converter of vehicle. Particular embodiments of the present invention relate to an insulation structure of a catalytic converter of vehicle including insulation material and an insulation cover minimizing heat loss of the catalytic converter.

An exemplary embodiment of the present invention provides an insulation structure of catalytic converter of vehicle, which is for maximizing nitrogen oxide purification efficiency of a catalytic converter system having LNT and SDPF. To solve problems of low insulation effect of insulation material applied for insulating in a conventional converter and heat loss by conduction and radiation of metal insulation cover attached to converter body by welding, the converter cover is made by using fumed silica which is new insulation material with heatproof fabric material to minimize heat loss.

An insulation structure of catalytic converter of vehicle according to an exemplary embodiment of the present invention includes an LNT converter that is formed so that exhaust gas discharged from an engine flows into the LNT converter and then exits through the opposite side, traps nitrogen oxide contained in the exhaust gas under a lean environment in which an air/fuel ratio is low, desorbs the trapped nitrogen oxide under an environment enriched with the exhaust gas, and reduces the nitrogen oxide contained in the exhaust gas or the desorbed nitrogen oxide. A connecting housing changes a direction of a path of the exhaust gas discharged from the LNT converter to a vertical direction, and is provided such that a urea reducing agent is injected to the exhaust gas when it is needed. An SDPF converter changes a direction of a path of the exhaust gas flowing from the connecting housing to a direction opposite to a direction in which the exhaust gas is discharged from the LNT converter, reduces nitrogen oxide contained in the exhaust gas using the injected reducing agent, and SCR catalyst is coated on a filter. An insulation cover including an inner surface contacting the LNT converter, the connecting housing and the SDPF converter and outer surface which is opposing surface to the inner surface, surrounds the LNT converter, the connecting housing and the SDPF converter. The insulation cover insulates heat generated from the LNT converter, the connecting housing and the SDPF converter. An insulation material is inserted and attached between the outer surface and the inner surface of the insulation cover.

The insulation cover may be made of fabric material.

The fabric material may include silica fabric or glass fabric.

The inner surface of the insulation cover may be made of silica fabric and vermiculite.

The outer surface of the insulation cover may be made by silicon coating or aluminum thin plate coating on glass fabric in 150 degrees to 600 degrees.

The inner surface and the outer surface of the insulation cover may be combined by sewing by heatproof thread.

The insulation cover may be made of flexible ceramic cover material.

The outer surface of the insulation cover may be fixed each other by a hook and loop fastener (e.g., Velcro™) strip for high temperature, or metal strip to surround the LNT converter, the connecting housing and the SDPF converter.

The insulation material may include fumed silica.

The insulation material may be covered by packing material.

The packing material may include glass fabric HT.

The insulation material may be sewed by high temperature heatproof thread to be fixed to the insulation cover.

The LNT converter may be replaced with diesel oxidization catalyst (DOC) oxidizing carbon monoxide and hydrocarbon.

The SDPF converter may be replaced with diesel particulate filter (DPF) collecting particulate matter included in exhaust gas.

According to an exemplary embodiment of the present invention, exhaust temperature raise becomes fast and regeneration efficiency increases during SDPF regeneration.

Also, temperature raise time for SDPF regeneration becomes short so that regeneration fuel efficiency is improved.

Also, noise may be reduced by covering the catalytic converter mostly by insulation cover.

Figure 1:
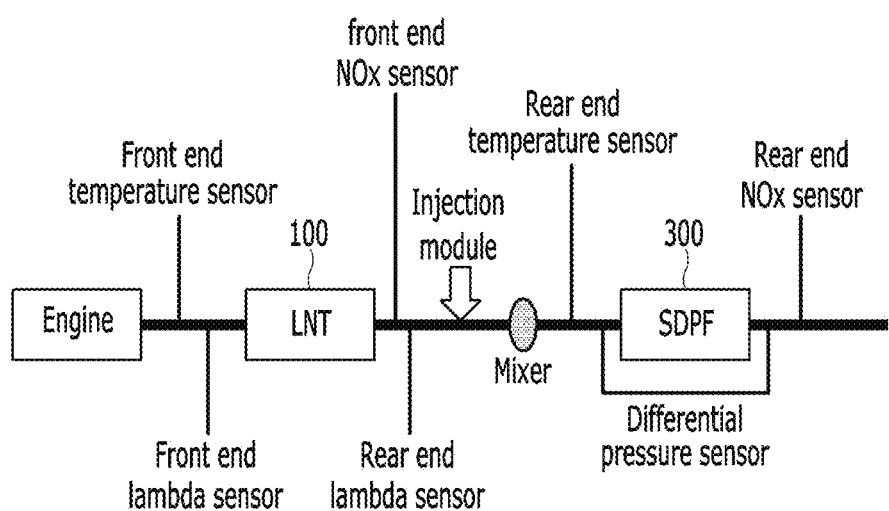
FIG. 1 is a block diagram illustrating a configuration of a catalytic converter of vehicle according to an exemplary embodiment of the present invention.

The following references symbols can be used in conjunction with the drawings:
- 100: LNT converter
- 200: connecting housing
- 300: SDPF converter
- 10: insulation material
- 15: packing material
- 20: insulation cover
- 20-1: inner surface of insulation cover
- 20-2: outer surface of insulation cover

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use like reference numerals for showing similar features. It will be understood that when an element such as a layer, film, region, or substrate is referred to as being "on" another element, it can be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

Now, a catalytic converter of vehicle according to an exemplary embodiment of the present invention will be described with reference to FIG. 1 and FIG. 2.

Figure 2:
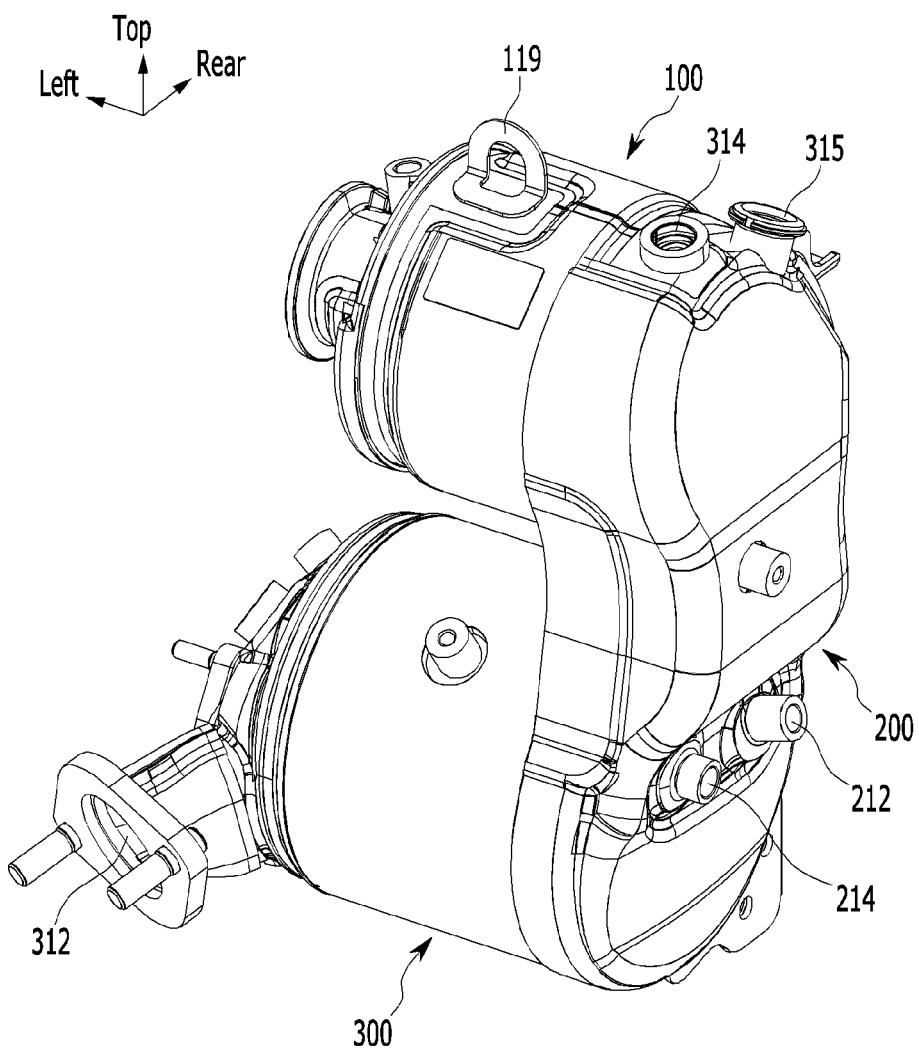
FIG. 2 is a perspective view illustrating the catalytic converter of vehicle according to the exemplary embodiment of the present invention.

FIG. 1 is a block diagram illustrating a configuration of a catalytic converter of vehicle according to an exemplary embodiment of the present invention, and FIG. 2 is a perspective view illustrating the catalytic converter of vehicle according to the exemplary embodiment of the present invention. In this case, for convenience of explanation, a configuration of catalytic converter of vehicle according to the exemplary embodiment of the present invention is schematically illustrated, but the configuration of catalytic converter of vehicle is not limited thereto.

Referring to FIG. 1, a catalytic converter of vehicle according to an exemplary embodiment of the present invention includes an LNT converter 100, a connecting housing and an SDPF converter 300.

Exhaust gas, which flows into and exits from the LNT converter 100, flows from the left to the right based on the drawings.

The connecting housing 200 changes the path of the exhaust gas so that the exhaust gas discharged from the LNT converter 100 flows vertically downward. That is, the exhaust gas flows from the upper side to the lower side inside the connecting housing 200. In this case, a reducing agent is injected to the exhaust gas through an injection module.

Further, the exhaust gas, which flows into the SDPF converter 300 from the connecting housing 200, flows from the right to the left inside the LNT converter 100. That is, a direction in which the exhaust gas flows inside the LNT converter 100 is opposite to a direction in which the exhaust gas flows inside the SDPF converter 300.

Since the direction in which the exhaust gas flows inside the LNT converter 100 is opposite to the direction in which the exhaust gas flows inside the SDPF converter 300, there is an effect of directly connecting the LNT converter 100 and the SDPF converter 300, and thus it is possible to minimize heat loss of the exhaust gas.

The LNT converter 100 is formed so that exhaust gas discharged from an engine flows into the LNT converter 100 and then exits through the opposite side, traps nitrogen oxide contained in the exhaust gas under a lean environment in which an air/fuel ratio is low, desorbs the trapped nitrogen oxide under an environment enriched with the exhaust gas, and reduces the nitrogen oxide contained in the exhaust gas or the desorbed nitrogen oxide.

Further, the connecting housing 200 changes a direction of a path of the exhaust gas discharged from the LNT converter 100 to a vertical direction, and is provided such that a urea reducing agent is injected to the exhaust gas when it is needed, and the SDPF converter 300 changes a direction of a path of the exhaust gas flowing from the connecting housing 200 to a direction opposite to a direction in which the exhaust gas is discharged from the LNT converter 100, reduces nitrogen oxide contained in the exhaust gas using the injected reducing agent, and SCR catalyst is coated on a filter.

At a side of the SDPF outlet 312, there are formed a rear end nitrogen oxide sensor bracket 315 on which a rear end nitrogen oxide sensor is installed, and a rear end pressure sensor bracket 314 on which a differential pressure sensor is installed. The rear end nitrogen oxide sensor detects the amount of nitrogen oxide contained in the exhaust gas passing through the SDPF catalyst. The differential pressure sensor is installed between the rear end pressure sensor bracket 314 and the front end pressure sensor bracket 214. The differential pressure sensor detects a difference in pressure of the exhaust gas between before and after the exhaust gas passes through the SDPF catalyst. Also, a temperature sensor bracket 212 is installed at a front end of SDPF.

Meanwhile, the LNT converter 100 may be replaced with diesel oxidization catalyst (DOC) oxidizing carbon monoxide and hydrocarbon, and the SDPF converter 300 may be replaced with diesel particulate filter (DPF) collecting particulate matter included in exhaust gas.

Hereinafter, a catalytic converter of vehicle according to an exemplary embodiment of the present invention will be described by referring FIG. 3 to FIG. 6.

Figure 3:
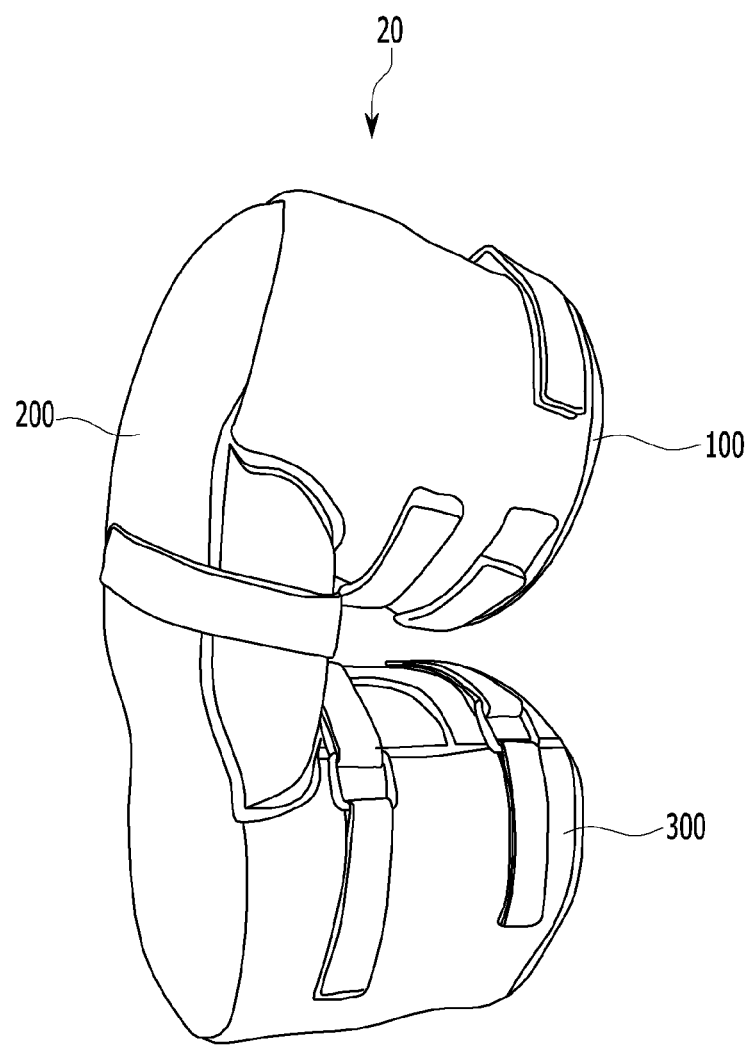
FIG. 3 is a perspective view illustrating insulation structure of the catalytic converter of vehicle according to an exemplary embodiment of the present invention.
Figure 4:
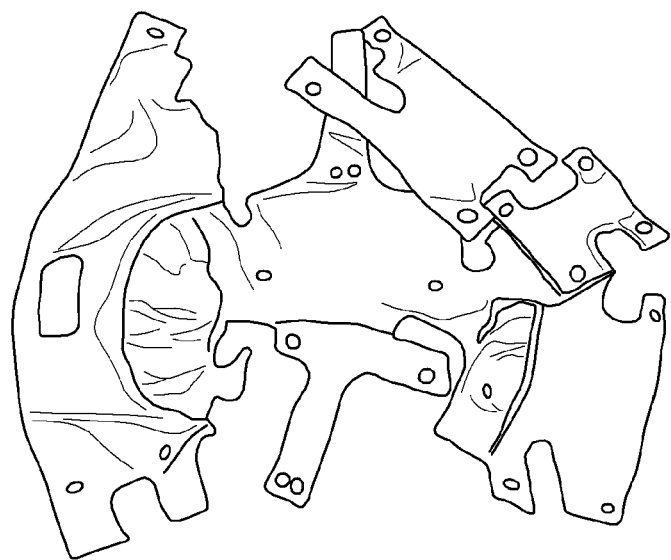
FIG. 4 is a schematic drawing of outer surface of the insulation cover according to an exemplary embodiment of the present invention.
Figure 5:
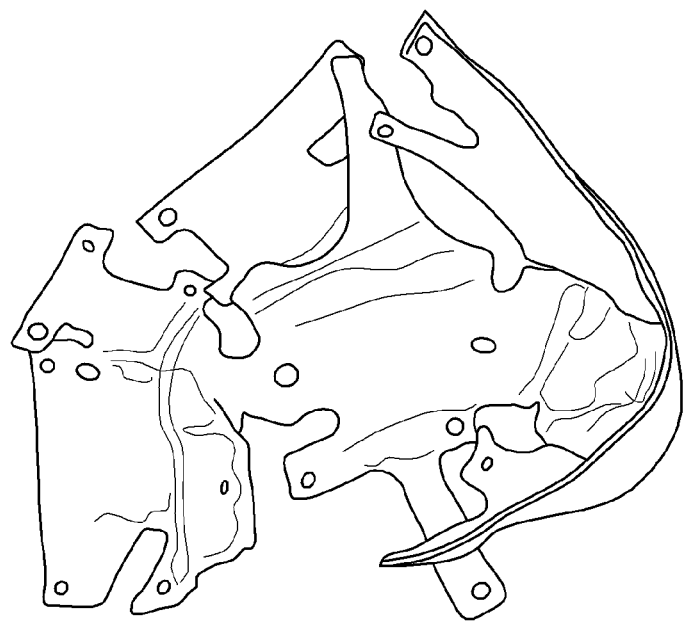
FIG. 5 is a schematic drawing of inner surface of the insulation cover according to an exemplary embodiment of the present invention.
Figure 6:
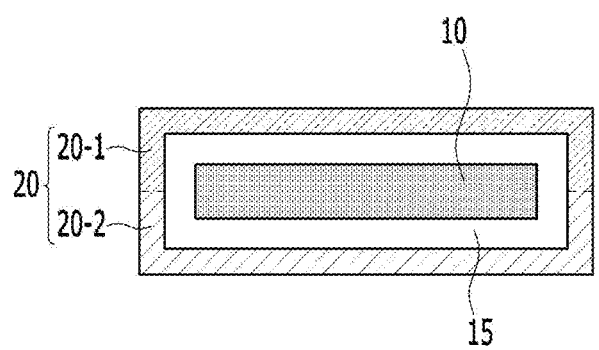
FIG. 6 is a drawing combined structure of insulation material and the insulation cover according to an exemplary embodiment of the present invention.

FIG. 3 is a perspective view illustrating insulation structure of the catalytic converter of vehicle according to an exemplary embodiment of the present invention, FIG. 4 is a schematic drawing of outer surface of the insulation cover according to an exemplary embodiment of the present invention, FIG. 5 is a schematic drawing of inner surface of the insulation cover according to an exemplary embodiment of the present invention, and FIG. 6 is a drawing combined structure of insulation material and the insulation cover according to an exemplary embodiment of the present invention.

Referring to FIG. 3 to FIG. 4, an insulation structure of a catalytic converter includes an insulation cover 20 and an insulation material 10. The insulation cover 20 includes inner surface 20-1 contacting the LNT converter 100, the connecting housing 200 and the SDPF converter 300 and outer surface 20-2 which is opposing surface to the inner surface 20-1, surrounds the LNT converter 100, the connecting housing 200 and the SDPF converter 300, and insulates heat generated from the LNT converter 100, the connecting housing 200 and the SDPF converter 300.

The insulation cover 20 may be made of fabric material. The fabric material has high temperature heatproof characteristics and effect of insulating heat by conduction from the catalytic converter. Therefore, effect that the insulation material blocks heat is maximized.

The fabric material may include silica fabric or glass fabric. The inner surface of the insulation cover contacting the catalytic converter may be made of silica fabric and vermiculite.

The outer surface 20-2 of the insulation cover may be made by silicon coating or aluminum thin plate coating on glass fabric in middle temperature of about 150 degrees to about 600 degrees since outer portion of the insulation cover 20 is not exposed to high temperature rather than inner portion. The outer surface 20-2 of the insulation cover 20 has to be prevented from contamination by oil and dust etc. and have waterproof function from rain and car washing etc. Also, the outer surface 20-2 of the insulation cover 20 has to have low heat transfer rate by conduction since heat blocking effect preventing heat from transferring to circumstance components of outside of the catalytic converter has to be existed.

The inner surface 20-1 and the outer surface 20-2 of the insulation cover 20 may be combined by sewing by heatproof thread, and the insulation cover 20 may be made of flexible ceramic cover material.

Meanwhile, the outer surface 20-2 of the insulation cover 20 may be fixed each other by a hook and loop fastener (e.g., Velcro™) strip for high temperature, or metal strip to surround the LNT converter 100, the connecting housing 200 and the SDPF converter 300.

The inner surface 20-1 of high temperature heatproof material and the outer surface 20-2 of middle temperature heatproof material are sewed by thread for high temperature, and insulation material 10 is inserted and attached between them so that the insulation cover 20 surrounds the catalytic converter similarly to put on clothes on the catalytic converter to insulate the catalytic converter.

The insulation material 10 may include fumed silica. The insulation material 10 may be covered by packing material 15, and the packing material 15 may include glass fabric HT. The insulation material 10 is sewed by high temperature heatproof thread to be fixed to the insulation cover 20. The insulation material 10 may be insulation material of conventional silica non-woven or ceramic blanket type besides fumed silica material. Particularly, in case the silica or ceramic fabric is monofilament, if the fabric is inserted into the insulation cover 20 and made, the insulation material 10 does not contact human body to improve efficiency of the insulation material 10.

Figure 7:
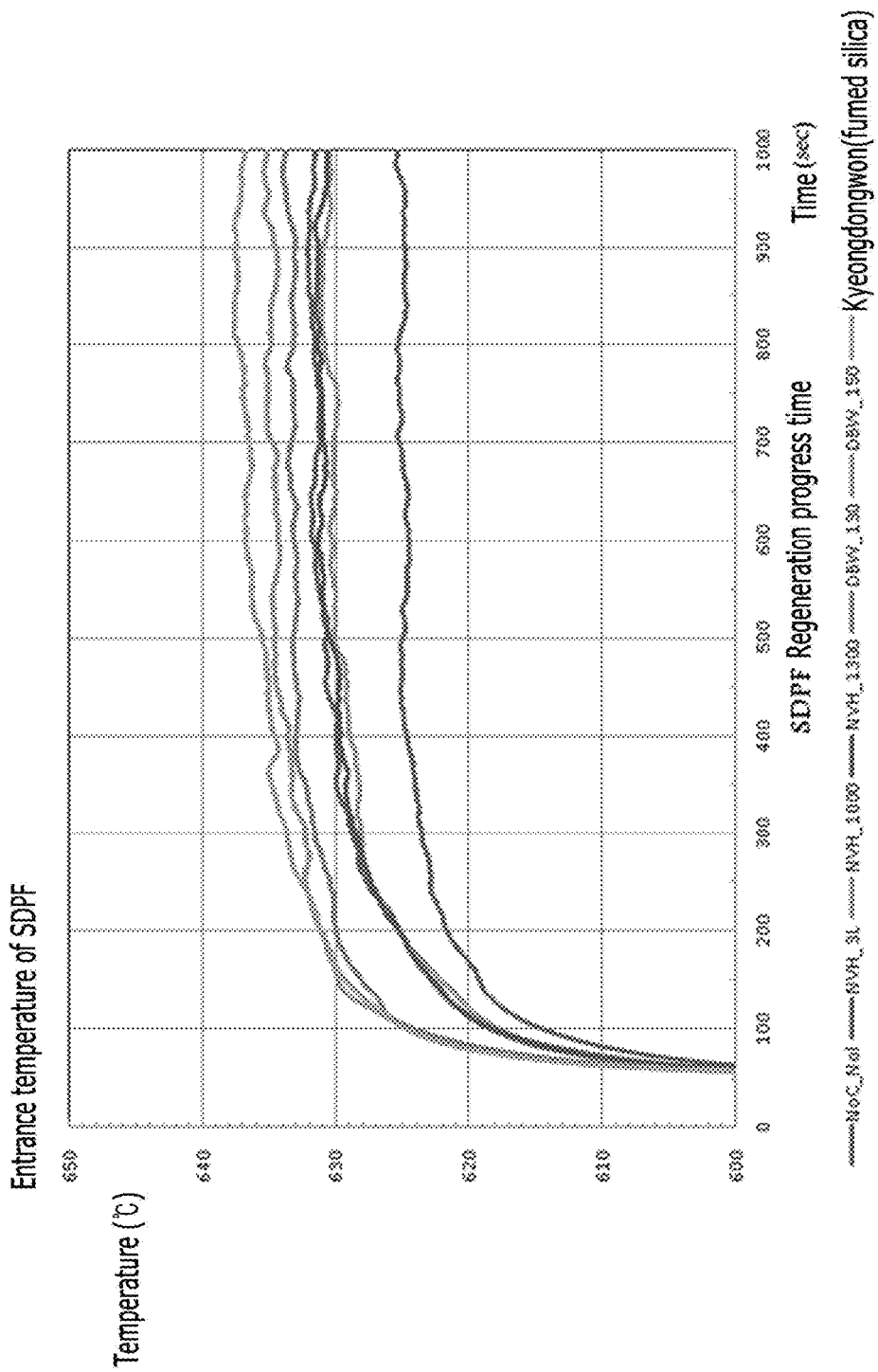
FIG. 7 is a graph illustrating characteristics of SDPF entrance temperature during SDPF regeneration according to material of the insulation material and the insulation cover according to an exemplary embodiment of the present invention.

FIG. 7 is a graph illustrating characteristics of SDPF entrance temperature during SDPF regeneration according to material of the insulation material and the insulation cover according to an exemplary embodiment of the present invention.

Referring to FIG. 7, change of SDPF entrance temperature according to regeneration progress time is illustrated, in case the insulation cover 20 and the insulation material 10 are not exist (NoC_Nol), in case compound 3 layers of silica N/P non-woven, ceramic blanket and silica N/P non-woven, in case 1000 g/m² surface density of silica N/P non-woven (NVH_1000), in case 1300 g/m² surface density of silica N/P non-woven (NVH_1300), in case 130 g/m² surface density of silica N/P non-woven (DBW_130), in case 150 g/m² surface density of silica N/P non-woven (DBW_150), and in case fumed silica is used (kyeongdongwon (fumed silica)).

As shown in FIG. 7, in case fumed silica is used as insulation material (kyeongdongwon (fumed silica)), entrance temperature of the SDPF is high so that insulation performance is excellent. Also, as insulation area and insulation material density is high, insulation effect is excellent, and temperature of SDPF entrance does not reach 630 degrees in case the insulation cover 20 and insulation material 10 are not exist (NoC_Nol).

Figure 8:
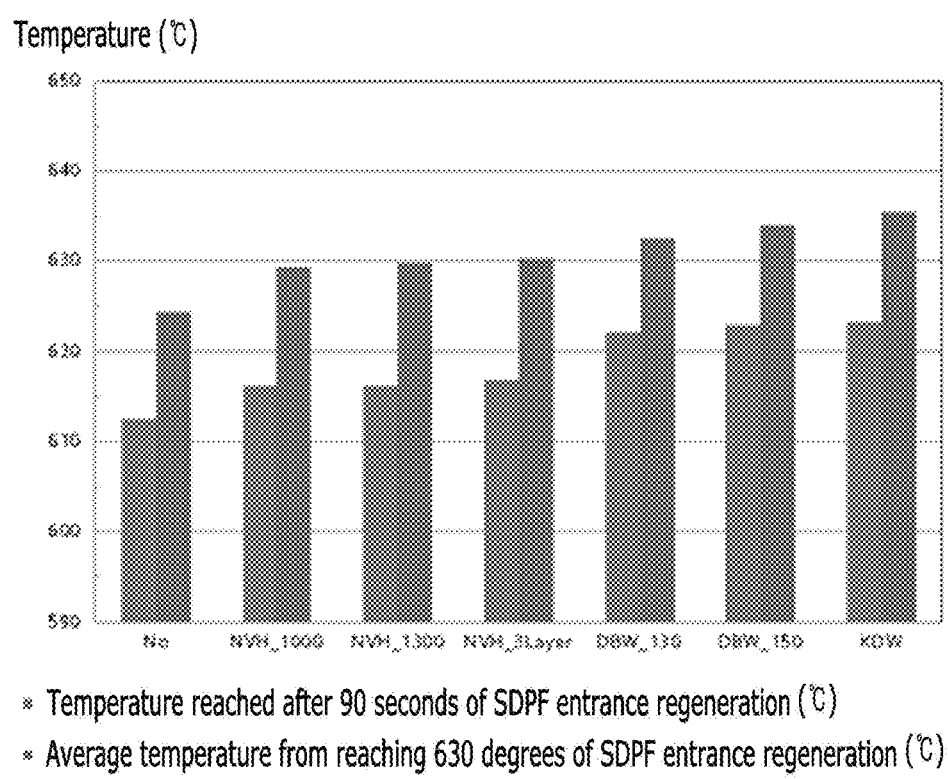
FIG. 8 is a graph illustrating characteristics of SDPF entrance temperature according to material of the insulation material and the insulation cover according to an exemplary embodiment of the present invention.

FIG. 8 is a graph illustrating characteristics of SDPF entrance temperature according to material of the insulation material and the insulation cover according to an exemplary embodiment of the present invention.

As shown in FIG. 8, temperature reached after 90 seconds of SDPF entrance regeneration is highest in case fumed silica is used as insulation material (KDW). Also, average temperature from reaching 630 degrees of SDPF entrance regeneration to ending of regeneration is highest in case fumed silica is used as insulation material (KDW). Therefore, insulation effect is most excellent in this case. In case the insulation cover 20 and the insulation material 10 are not exist (No), it is not possible to reach regeneration goal temperature (630 degrees).

Figure 9:
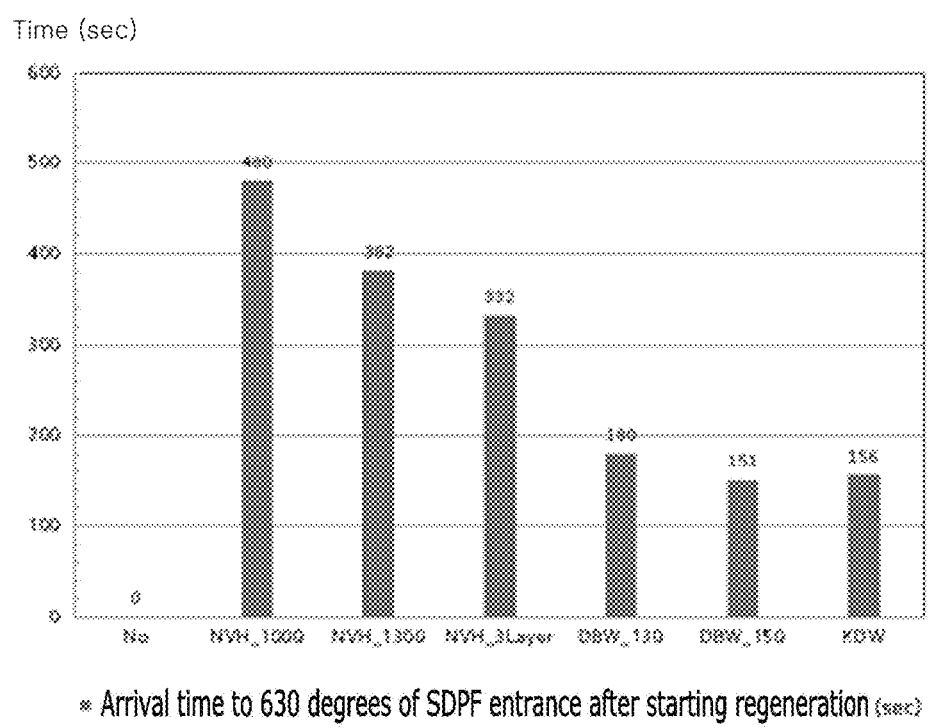
FIG. 9 is a graph illustrating arrival time to 630 degrees of SDPF entrance after starting regeneration according to material of the insulation material and the insulation cover according to an exemplary embodiment of the present invention.

FIG. 9 is a graph illustrating arrival time to 630 degrees of SDPF entrance after starting regeneration according to material of the insulation material and the insulation cover according to an exemplary embodiment of the present invention.

As shown in FIG. 9, time which entrance temperature of the SDPF to reach 630 degrees after regeneration is shortest in case 150 g/m² surface density of silica N/P non-woven (DBW_150) and in case fumed silica is used (KDW).

As shown in FIG. 8 and FIG. 9, entrance temperature of the SDPF after reaching 630 degrees is highest in case fumed silica is used as insulation cover 20 and insulation material 10 (KDW) so that heat loss is least, and it is expected that regeneration period of the SDPF is shortened.

Figure 10:
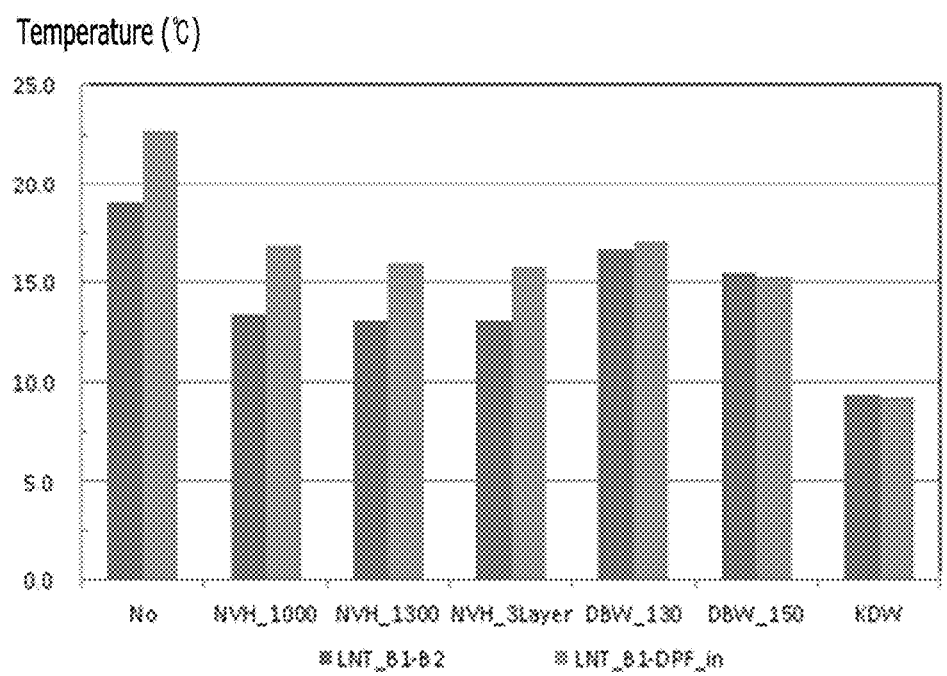
FIG. 10 is a graph illustrating analysis of heat loss of the catalytic converter during whole regeneration period according to material of the insulation material and the insulation cover according to an exemplary embodiment of the present invention.

FIG. 10 is a graph illustrating analysis of heat loss of the catalytic converter during whole regeneration period according to material of the insulation material and the insulation cover according to an exemplary embodiment of the present invention.

Referring to FIG. 10, difference of generation of heat between a front end B1 and rear end B2 of the LNT which is LNT catalyst deterioration index during total regeneration period is least in case fumed silica is used as insulation cover 20 and insulation material 10 (KDW) so that it is advantageous in preventing the LNT catalyst from deterioration. Also, difference of temperature between the front end of the LNT and the entrance of the SDPF during regeneration is least in case fumed silica is used as insulation cover 20 and insulation material 10 (KDW) to shorten soot regeneration period and improve fuel efficiency.

Figure 11:
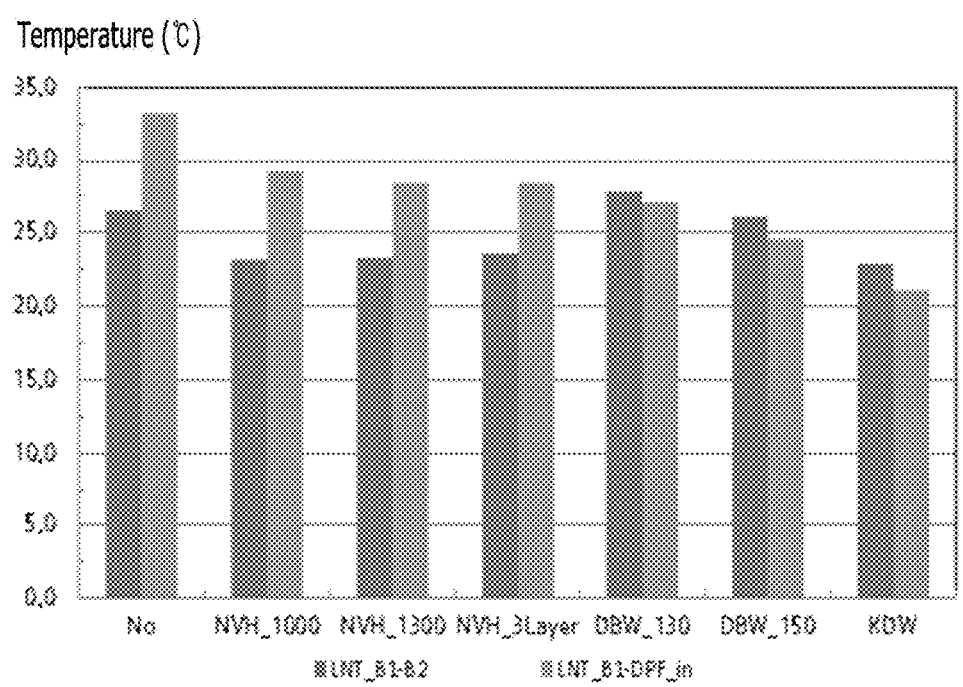
FIG. 11 is a graph illustrating analysis of heat loss of the catalytic converter during the beginning period of regeneration according to material of the insulation material and the insulation cover according to an exemplary embodiment of the present invention.

FIG. 11 is a graph illustrating analysis of heat loss of the catalytic converter during beginning period of regeneration according to material of the insulation material and the insulation cover according to an exemplary embodiment of the present invention.

As shown in FIG. 11, difference of generation of heat between the front end B1 and the rear end B2 of the LNT at the beginning of regeneration within 90 seconds is least in case fumed silica is used as insulation cover 20 and insulation material 10 (KDW) to be excellent for insulation effect. At the beginning of regeneration of the SDPF, difference of temperature between the LNT and the SDPF is not large by same level of unburned hydrocarbon (HC).

Figure 12:
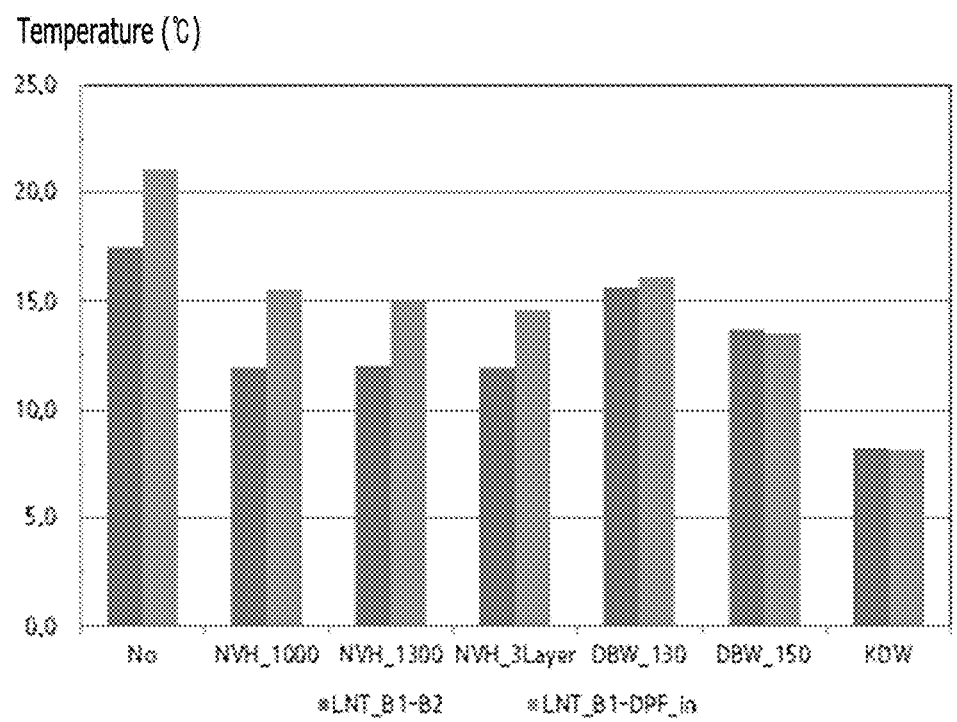
FIG. 12 is a graph illustrating analysis of heat loss of the catalytic converter during the late period of regeneration according to material of the insulation material and the insulation cover according to an exemplary embodiment of the present invention.

FIG. 12 is a graph illustrating analysis of heat loss of the catalytic converter during the late period of regeneration according to material of the insulation material and the insulation cover according to an exemplary embodiment of the present invention.

As shown in FIG. 12, difference of generation of heat between the front end B1 and the rear end B2 of the LNT at the latter period of regeneration after 90 seconds is least in case fumed silica is used as insulation cover 20 and insulation material 10 (KDW) to be excellent for insulation effect. Also, it is expected that regeneration period of the SDPF is shortened and regeneration efficiency of the SDPF and fuel efficiency in a low temperature regeneration condition of middle and low load driving is improved.

Like this, according to an exemplary embodiment of the present invention, exhaust temperature raise becomes fast and regeneration efficiency increases during SDPF regeneration.

Also, temperature raise time for SDPF regeneration becomes short so that regeneration fuel efficiency is improved.

Also, noise may be reduced by covering the catalytic converter mostly by insulation cover.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An apparatus including an insulation structure of a catalytic converter of a vehicle, comprising:
    an LNT (lean NOx trap) converter formed so that exhaust gas discharged from an engine flows into the LNT converter and then exits through an opposite side, the LNT configured to trap nitrogen oxide contained in the exhaust gas under a lean environment in which an air/fuel ratio is low, to desorb the trapped nitrogen oxide under an environment enriched with the exhaust gas, and to reduce the nitrogen oxide contained in the exhaust gas or the desorbed nitrogen oxide;
    a connecting housing connected to change a direction of a path of the exhaust gas discharged from the LNT converter to a vertical direction, the connecting housing configured such that a urea reducing agent can be selectively injected to the exhaust gas;
    an DPF (diesel particulate filter) converter connected to change a direction of a path of the exhaust gas flowing from the connecting housing to a direction opposite to a direction in which the exhaust gas is discharged from the LNT converter, the DPF converter configured to reduce the nitrogen oxide contained in the exhaust gas using the injected reducing agent, wherein the DPF converter comprises an SDPF converter, where SDPF refers to a DPF with a selective catalytic reduction (SCR) catalyst coated thereon;
    an insulation cover with an inner surface that contacts the LNT converter, the connecting housing and the DPF converter and an outer surface opposite the inner surface, the insulation cover surrounding the LNT converter, the connecting housing and the DPF converter, and configured to insulate heat generated from the LNT converter, the connecting housing and the DPF converter, wherein the inner surface of the insulation cover comprises silica fabric and vermiculite and wherein the outer surface of the insulation cover is made by silicon coating or aluminum thin plate coating on a glass fabric; and an insulation material disposed between the outer surface and the inner surface of the insulation cover, wherein the insulation material comprises fumed silica.

2. The apparatus of claim 1, further comprising heatproof thread sewn between the inner surface and the outer surface of the insulation cover.

3. The apparatus of claim 1, wherein the insulation cover comprises a flexible ceramic cover material.

4. The apparatus of claim 1, wherein the outer surface of the insulation cover is fixed by a hook and loop fastener strip for high temperature to surround the LNT converter, the connecting housing and the SDPF converter.

5. The apparatus of claim 1, wherein the outer surface of the insulation cover is fixed by a metal strip to surround the LNT converter, the connecting housing and the SDPF converter.

6. The apparatus of claim 1, wherein the insulation material is covered by a packing material.

7. The apparatus of claim 6, wherein the packing material comprises glass fabric HT.

8. The apparatus of claim 1, further comprising high temperature heatproof thread fixing the insulation material to the insulation cover.

9. An apparatus for a vehicle, comprising:
a catalytic converter located so that exhaust gas discharged from an engine of the vehicle flows into the catalytic converter and then exits through an opposite side;
a connecting housing connected to change a direction of a path of the exhaust gas discharged from the catalytic converter to a vertical direction;
a diesel particulate filter (DPF) converter connected to change a direction of a path of the exhaust gas flowing from the connecting housing to a direction opposite to a direction in which the exhaust gas is discharged from the catalytic converter;
an insulation cover with an inner surface that contacts the catalytic converter, the connecting housing, and the DPF converter and an outer surface opposite the inner surface, the insulation cover surrounding the catalytic converter, the connecting housing and the DPF converter, and configured to insulate heat generated from the catalytic converter, the connecting housing and the DPF converter; and
an insulation material disposed between the outer surface and the inner surface of the insulation cover;
wherein the DPF converter comprises an SDPF converter, where SDPF refers to a DPF with a selective catalytic reduction (SCR) catalyst coated thereon;
wherein the inner surface of the insulation cover comprises silica fabric and vermiculite;
wherein the outer surface of the insulation cover is made by silicon coating or aluminum thin plate coating on a glass fabric; and
wherein the insulation material comprises fumed silica.

10. The apparatus of claim 9, wherein the catalytic converter comprises an LNT (lean NOx trap) converter that is configured to trap nitrogen oxide contained in the exhaust gas under a lean environment in which an air/fuel ratio is low, desorb the trapped nitrogen oxide under an environment enriched with the exhaust gas, and reduce the nitrogen oxide contained in the exhaust gas or the desorbed nitrogen oxide.

11. The apparatus of claim 9, wherein the catalytic converter comprises a diesel oxidization catalyst (DOC) converter configured to oxidize carbon monoxide and hydrocarbon.

12. The apparatus of claim 10, wherein the DPF converter is configured to reduce the nitrogen oxide contained in the exhaust gas using the injected reducing agent.

13. The apparatus of claim 9, wherein the connecting housing is configured such that a urea reducing agent can be selectively injected to the exhaust gas.

14. The apparatus of claim 9, further comprising heatproof thread sewn between the inner surface and the outer surface of the insulation cover.

15. The apparatus of claim 9, wherein the insulation cover comprises a flexible ceramic cover material.

16. The apparatus of claim 9, wherein the outer surface of the insulation cover is fixed by a hook and loop fastener strip for high temperature to surround the catalytic converter, the connecting housing and the SDPF converter.

17. The apparatus of claim 9, wherein the outer surface of the insulation cover is fixed by a metal strip to surround the catalytic converter, the connecting housing and the SDPF converter.

18. The apparatus of claim 9, wherein the insulation material is covered by a packing material.

19. The apparatus of claim 18, wherein the packing material comprises glass fabric HT.

20. The apparatus of claim 9, further comprising high temperature heatproof thread fixing the insulation material to the insulation cover.

* * * * *